(12) United States Patent
Wannas (10) Patent No.: US 9,546,822 B2
(45) Date of Patent: Jan. 17, 2017

(54) FLOW DIRECTORS

(71) Applicant: Akeel Ali Wannas, Baghdad (IQ)

(72) Inventor: Akeel Ali Wannas, Baghdad (IQ)

( * ) Notice: Subject to any disclaimer, the term of this patent is extended or adjusted under 35 U.S.C. 154(b) by 22 days.

(21) Appl. No.: 14/792,022

(22) Filed: Jul. 6, 2015

(65) Prior Publication Data

US 2015/0308748 A1 Oct. 29, 2015

Related U.S. Application Data

(62) Division of application No. 13/914,626, filed on Jun. 11, 2013, now Pat. No. 9,109,839.

(51) Int. Cl.
| | |
|---|---|
| *B01F 3/04* | (2006.01) |
| *F28C 3/08* | (2006.01) |
| *F28C 1/02* | (2006.01) |
| *F28F 25/02* | (2006.01) |
| *F28C 1/00* | (2006.01) |
| *F28C 1/04* | (2006.01) |

(52) U.S. Cl.
CPC ............ *F28C 3/08* (2013.01); *B01F 3/04078* (2013.01); *B01F 3/04482* (2013.01); *B01F 3/04496* (2013.01); *F28C 1/00* (2013.01); *F28C 1/02* (2013.01); *F28F 25/02* (2013.01); *F28C 1/04* (2013.01)

(58) Field of Classification Search
CPC ............ B01F 3/04078; B01F 3/04482; B01F 3/04496; F28C 1/02; F28F 25/02
USPC .................. 261/110, 152, 153, 160, DIG. 11
See application file for complete search history.

(56) References Cited

U.S. PATENT DOCUMENTS 6,206,348 B1 * 3/2001 Imsdahl .................. F02C 7/143
261/103

\* cited by examiner

*Primary Examiner* — Robert A Hopkins
(74) *Attorney, Agent, or Firm* — Jeanette Meng Nakagawa (57) ABSTRACT

The present invention relates to liquid to air evaporative heat exchange apparatus, mainly for cooling towers, air conditioning units, and humidifies alike. The present invention incorporate an evaporative module embedded with a liquid delivery system with flow directors to control the flow of liquid through all of its layers. Such a design allows for an even and smooth liquid distribution, while at the same time maximized the duration and surface area for heat exchange to take place. The evaporative module of the present invention can be sealed off at various sections to redirect airflow. Such a design serves dual functions as a drift eliminator or regulator.

4 Claims, 7 Drawing Sheets

FLOW DIRECTORS

CROSS-REFERENCES TO RELATED APPLICATIONS

The present application is a Divisional of application Ser. No. 13/914,626 filed on Jun. 11, 2013, which is hereby incorporated herein by reference in its entirety.

TECHNICAL FIELD

The present invention, in some embodiments thereof, relates to liquid to air evaporative heat exchange apparatus, mainly for cooling towers, air conditioning units, and humidifies alike. Flow directors allow fluid to circulate through such an apparatus in a controlled manner. Flow directors can also be incorporated into any other apparatus where fluid circulation needs to be controlled in similar fashion.

BACKGROUND OF THE INVENTION

Evaporative cooling is a process of cooling air using the latent heat of the evaporation of water by keeping air and liquid water in a thermodynamic relationship. Temperature of dry air can be lowered significantly when it is passed through liquid water and turns water into water vapor. In extremely dry conditions, evaporative cooling has an added benefit of introducing moisture into dry air. So the input of a evaporative cooling apparatus is hot and dry air, while the output of the apparatus is cooler and moist air, which greatly improves the comfort level for the occupants of the space that the apparatus is intended for.

Evaporative cooling apparatus is relatively simple, and the physical properties of various stages of the process are well measured and understood. With growing concerns for the environment and rising costs associated with energy consumption, however, there is a renewed interest in improving the efficiency of such devices. The current invention of a multi-layered evaporative media module intended for heat exchange apparatus improves the efficiency of evaporative cooling through its new design in the following five main areas.

First, the design of the present invention utilizes almost the entire volume of the cooling tower for heat exchange purpose. Typical evaporative cooling devices employs a water delivery system that occupies the space on top of the evaporative media, for example, as illustrated in patents U.S. Pat. Nos. 7,992,406, 7,765,827, 3,116,612, and 4,380,910. The present invention, however, comprises a novel liquid/water delivery system that is embedded within the evaporative media module, which then occupies the entire inner space of the cooling tower.

Second, the design of the present invention employs a novel liquid/water delivery system that delivers liquid/water onto each layer of the evaporative media module. Such a new system reduces the turbulence of interaction between air and liquid while maximizing surface area during the process of heat exchange. As illustrated in patents U.S. Pat. Nos. 7,992,406, 7,765,827, 3,116,612, and 4,380,910, a sprinkler system is often used by spraying water at various locations onto the evaporative media while passing air through the media at the same time. After water is released from the sprinklers, it is essentially in a free falling state, until it hits the surface of the evaporative media. The distribution of liquid/water in such a system is largely uneven, with the top layers of the evaporative media receiving the most amount of water, and much less so further down stream, thus results in unevenness in heat exchange itself. The present invention overcomes this problem of unevenness in the distribution of liquid/water, by calmly delivers liquid/water onto each layer of the evaporative media, and thus improves heat exchange efficiency.

Third, the present invention can be configured as either a parallel flow or as a counter flow heat exchanger, by simply reversing the air cycle. There are two primary classifications of heat exchange according to their flow arrangement. In a parallel-flow situation, air and liquid enter the exchanger from the same end, and travel in parallel to one anther while heat exchange takes place between the two. In a counter-flow situation, air and liquid enter the exchanger from opposite ends. The counter flow design is more efficient, because the temperature difference between the two media is greater along any unit length. In designs illustrated in patents U.S. Pat. Nos. 3,450,393, 3,792,841, 3,952,077, and 3,963,810, the direction of the flow of heat exchange can not be easily reversed without physically changing the inner components of the cooling tower. The present invention, however, can change the flow of heat exchange by simply reversing the air cycle.

Forth, the present invention can serve due functions as a heat exchanger and as a drift eliminator or drift regulator. As mentioned previously, evaporative coolers increase moisture along with cooler air temperature in its output. Too much moisture in the air, however, can introduce other well know problems for spaces intended for human inhabitation. In some instances, drift eliminators are placed on top of the evaporative cooler to remove excess water droplets from the air existing the cooling tower. The principle of drift eliminators are illustrated in patents U.S. Pat. Nos. 4,240,814, 4,427,607, 4,557,878, and 7,105,036, where the moisture laden air is forced to change directions repeatedly. Water droplets are separated from air and left behind due to physical drag, while air passes through with less obstruction, and exits in a much dryer form. The present invention of the evaporative media module comprises multiple evaporative media units, stacked vertically on top of another. Sections of these units can be strategically sealed off at various locations, and thus force the air stream to change directions at least twice, as it passes through each unit. Such a new design not only maximize surface areas for heat exchange, but also reduce or eliminate drift from the cooler air exiting the apparatus.

Fifth, the evaporative media module of the present invention can be constructed of non-perishable material. Traditional evaporative media often incorporate soft and porous material because it can retain a larger amount of water long enough for heat exchange to take place. This type of material, however, needs to be replace from time to time to reduce bacteria or fungi growth. The present invention overcomes this problem, and thus reduce the maintenance and operational costs associated with operating the cooling apparatus.

BRIEF SUMMARY OF EMBODIMENTS OF THE INVENTION

The present invention relates to liquid to air evaporative heat exchange apparatus, mainly for cooling towers, air conditioning units, and humidifies alike.

In a variant, the multi-layered liquid to air heat exchange apparatus through which liquid flows by gravity and is kept in a constant thermodynamic relationship with currents of passing air. The apparatus comprises a chamber; a first and second air openings connecting the chamber with ambient air. The apparatus comprises an evaporative media module disposed inside of the chamber occupying the space between first and second air openings. The evaporative module further comprises a plurality of evaporative media units assembled vertically in succession and in parallel to one another. The evaporative media unit further comprises a plurality of horizontal evaporative media layers with a top and a bottom surface, and the layers are assembled vertically in succession and in parallel to one another. The apparatus also comprises a liquid circulation system embedded in the evaporative media module and configured to deliver steady streams of liquid from a swamp tank at a bottom of the chamber to a top surface of the evaporative media module, and to direct the liquid flowing downward by gravity from one evaporative media layer to the next layer immediately below in vertical succession. The apparatus further comprises a blower connected to the first air opening for moving currents of air between the first air opening and the second air opening through the evaporative media module.

In a variant, the evaporative media unit further comprises a top evaporative media layer, a bottom evaporative media layer, and a plurality of intermediate evaporative media layers all sharing a common central vertical axis. All the evaporative media layers, except the bottom evaporative media layer, have a central portion removed around the central axis.

In another variant, the top evaporative media layer of the evaporative media unit is configured with an outer edge which fits and seals around a horizontal cross section of the inner surface of the chamber.

In still another variant, the intermediate and the bottom evaporative media layers of the evaporative media unit are configured with outer edges away from the horizontal cross section of the inner surface of the chamber at a pre-set distance.

In yet another variant, the liquid circulation system further comprises a pump and a control mechanism, configured to deliver liquid, via a plurality of ascending pipes, against gravity from the swamp tank at the bottom of the chamber to the top surface of the evaporative module.

In a further variant, the liquid circulation system comprises a plurality of descending pipes, wherein the descending pipes are vertical and parallel to each other, and are configured to intersect each evaporative media layer in succession.

Optionally, the descending pipes further comprise opposing openings along the wall of the descending pipes situated immediately above each intersection between the descending pipe and the evaporative media layer.

In a variant, the descending pipes further comprises a plurality of parallel flow directors diagonally situated inside of the descending pipes. The flow directors are configured as disks connecting the openings along the descending pipes from an upper evaporative media layer to the opposing openings along the descending pipe with the evaporative media layer immediately below.

In another variant, the evaporative media layers further comprises a plurality of fins, and the fins are configured as raised barriers on the top surface of the evaporative media layers with predetermined length and path.

In still another variant, the evaporative media layers further comprises a plurality of indentations on the top surface of the evaporative media layers, and the indentations are configured with predetermined length and path.

In yet another variant, any evaporative media layer can be fitted with a membrane, and the membrane is configured to extend from the outer edge of the layer until it reaches the inner surface of the chamber.

Optionally, the membrane comprises zero to a predetermined number of openings with predetermined sizes, wherein the number and size of the openings regulate the amount of liquid vapor passing through the membrane.

In a variant, the evaporative media module comprises a plurality of horizontal evaporative media layers assembled vertically in succession, in parallel to one another and share a vertical central axis, wherein each evaporative media layer further comprises an upper surface and a bottom surface.

In another variant, the evaporative media module further comprises a plurality of openings evenly distributed on each evaporative media layer. The openings are configured to allow liquid to pass through and have an upper surface raised above the upper surface of the evaporative media layer, and a bottom surface further below the bottom surface of the evaporative media layer.

In yet another variant, evaporative media layer in succession is horizontally displaced towards or away from the vertical central axis with a predetermined amount of displacement.

In still another variant, the displacement between the evaporative media layer and its central axis is calculated so that only a portion of the outer edge of the layer is in contact with the inner wall of the cooling chamber.

Optionally, the displacement from one evaporative media layer to the next layer immediately above or below is configured to vary in a periodical fashion.

In a variant, a liquid flow diverting system comprises a series of flow directors situated inside of a pipe connecting one evaporative media layer to the next. The pipe is configured with opposing openings immediately above where it intersects the evaporative media layers.

In another variant, the flow directors are configured as round or oval discs, and are parallel to one another.

In yet another variant, the flow directors are configured inside of the pipe diagonally, with an elevated end terminating above the opening from an upper evaporative media layer, and a lowered end terminating below the opposing opening from an evaporative media layer immediately below.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiment of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The present invention, in accordance with one or more various embodiments, is described in detail with reference to the following figures. The drawings are provided for purposes of illustration only and to merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE INVENTION

From time-to-time, the present invention is described herein in terms of example environments. Description in terms of these environments is provided to allow the various features and of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention, in some embodiments thereof, relates to liquid to air heat exchange apparatus, mainly for cooling towers, air conditioning units, and humidifies alike.

Figure 1:
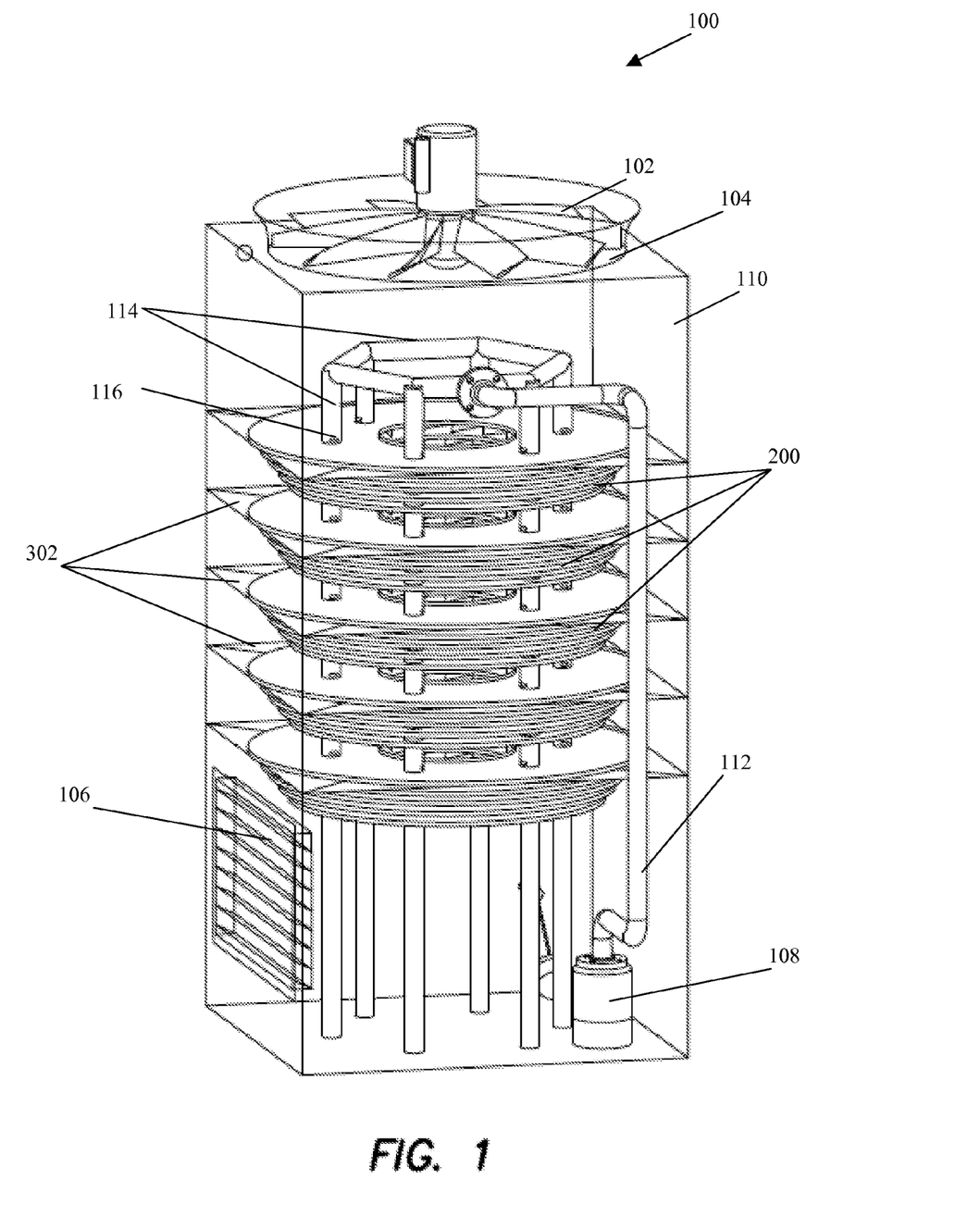
FIG. 1 is a schematic drawing which illustrates the multi-layered evaporative media disposed inside of a cooling chamber, connected with liquid and air circulation system, according to some embodiments of the present invention.

FIG. 1 illustrates a single unit 100 of the liquid to air heat exchange apparatus, which can be used alone, or connected in series to increase the capacity of the apparatus based on the size of the space it is intended for. The apparatus 100, in this exemplary embodiment, comprises a rectangular chamber 110, with a circular evaporative media module 200 disposed inside of the chamber. The chamber has an opening 104 on the top surface, which is fitted with a blower 102 for pumping air streams into or out of the chamber. The chamber also has an opening 106 on the lower wall, where ambient air can flow in or flow out. The openings of 104 and 106 are, in general, arranged at end locations of the chamber and oppose each other. The goal of such an arrangement is to ensure that the distance between the two openings is at the longest possible, and therefore maximizes the physical space for heat exchange to take place between air and liquid.

The bottom of the chamber 110 is used as a swamp tank where liquid is stored. A liquid pump 108, pumps the liquid up through a series of ascending pipes 112. The liquid is distributed and released onto the evaporative media module 200 when it reaches it's top surface. The liquid then travels by gravity downward through a series of descending pipes 114, which intersects the evaporative media 200 at multiple locations evenly distributed on each layer. Liquid can flow in and out of the descending pipes through a series of openings 116 situated immediately above where the pipes intersect each layer of the evaporative media. The chamber can have additional inlets or outlets (not illustrated in this figure) where liquid is introduced into or out of the swamp tank to compensate for evaporation and temperature fluctuation.

In the present example as illustrated in FIG. 1, the horizontal cross section of the chamber 110 and the evaporative media module 200 are of different shapes. Sealing corners 302 can be introduced in this situation to re-direct airflow which will be illustrated in FIG. 3 below in more detail.

Liquid and air heat exchange takes place on the surface of each layer of the evaporative media module 200. There are two primary classifications of heat exchange according to their flow arrangement. In a parallel-flow situation, air and liquid enter the exchanger from the same end, and travel in parallel to one anther while heat exchange takes place between the two. In a counter-flow situation, air and liquid enter the exchanger from opposite ends. The counter flow design is more efficient, because the temperature difference between the two media is greater along any unit length. The blower 102 in the present invention can be configured to direct streams of air either from opening 106 upward to opening 104, or from 104 downward to 106. Therefore, both forms of heat exchange, parallel or counter flow, can be achieved, depending on the specific set up or needs.

Figure 2:
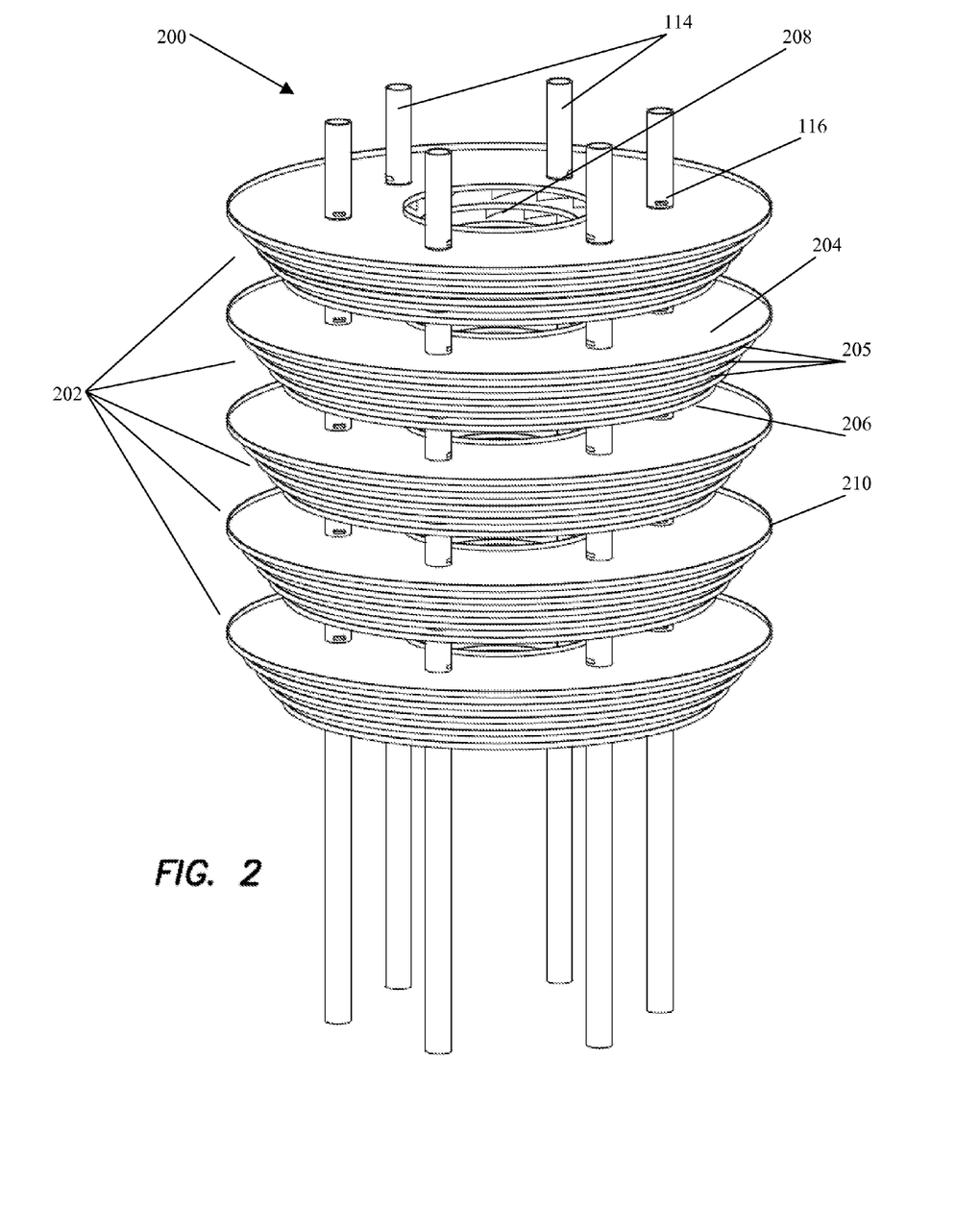
FIG. 2 is a schematic drawing which illustrates the multi-layered evaporative media by itself, according to some embodiments of the present invention.

FIG. 2 is a schematic drawing which illustrates the multi-layered evaporative media module by itself, according to some embodiments of the present invention. The evaporative media module 200 comprises a plurality of evaporative media units 202. In this particular example, the units are stacked vertically on top of one another.

Each evaporative media unit comprises a plurality of evaporative media layers. In an exemplary embodiment as illustrated in FIG. 2, the evaporative media unit comprises a top evaporative media layer 204, intermediate evaporative media layers 205, and a bottom evaporative media layer 206. Top layer 204 and intermediate layers 205 all have a center portion removed and form an opening 208. The bottom layer 206, however, does not have it's center portion removed, and forms a complete intact circle. The edges 210 of all the layers are slightly raised, in order to retain a certain amount of liquid on its surface. The evaporative media layers 204 and 205, therefore, forms a series of ring shaped discs or trays. The bottom layer 206, forms a complete circular disc or tray.

As illustrated in FIG. 2, the diameter of the top layer 204 is greater than the subsequent layers 205 and 206. A series of descending pipes 114 intersect the evaporative media module 200 at multiple locations evenly distributed on each layer. Liquid can flow in and out of the descending pipes 114, onto or out of each evaporative media layer, through a series of openings 116 situated immediately above where the pipes intersect each layer of the evaporative media. Heat exchange between air and liquid takes place on the surface of each evaporative media layer. For instance, if the blower 102 directs warm ambient air streams from outside through openings 106 and upwards. The warm air ascends as liquid descends, and heat exchanges between the two takes place on the surface of each evaporative media layer, and as a result cooler air exits through 104.

The efficiency of a liquid to air heat exchange apparatus is positively correlated with the surface area where the heat exchange takes place, i.e., the larger the surface area of contact between liquid and air, the more heat can be exchanged between the two media. In the present invention, liquid is distributed onto the evaporative media layers which have large surface area. Air is directed between the layers to ensure the longest possible path as it travels form one opening to the other.

Figure 3:
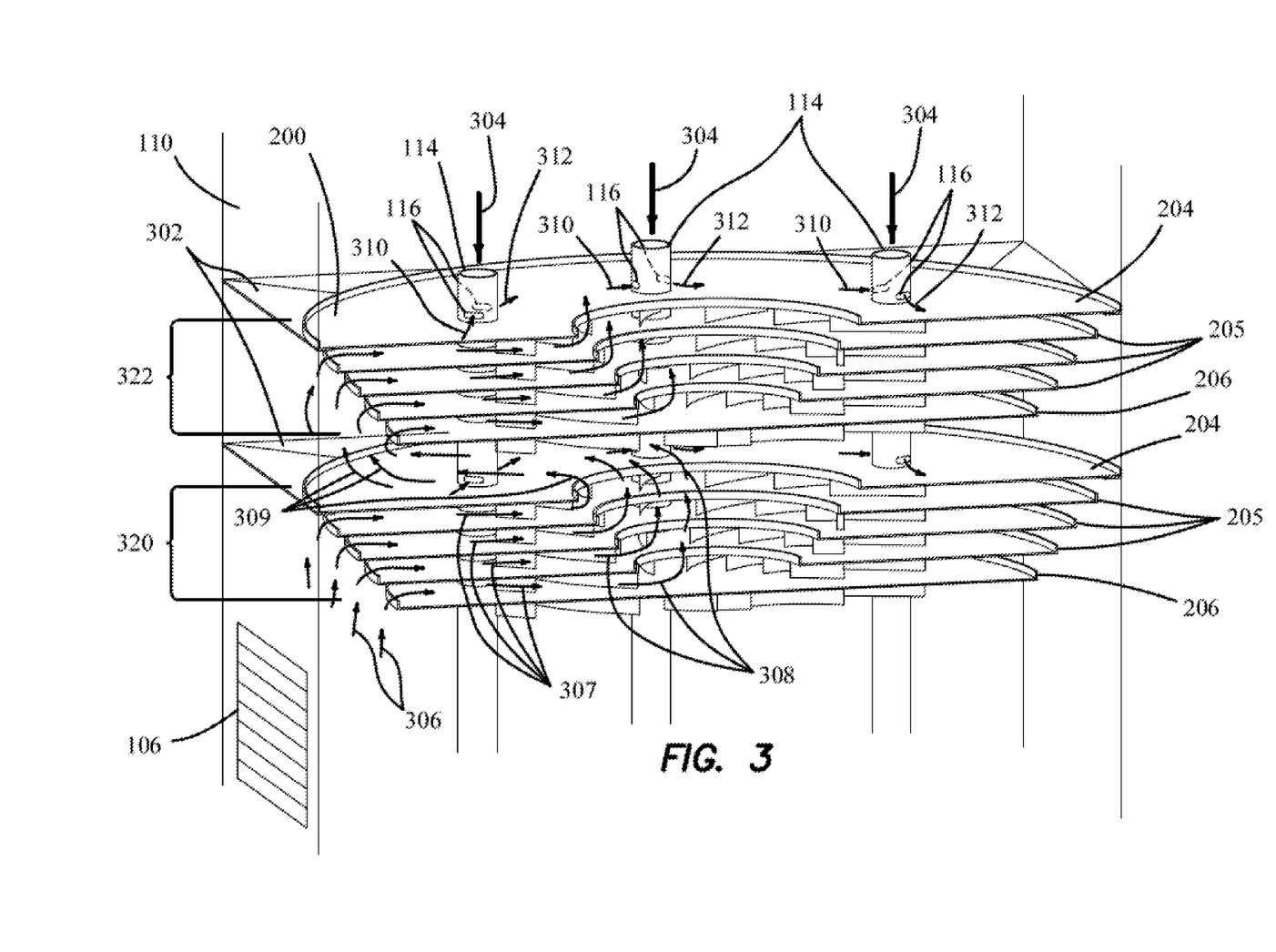
FIG. 3 is a schematic drawing of a vertical cross-section of the multi-layered evaporative media, for the purpose of illustrating the circulation of liquid and air among each layer, according to some embodiments of the present invention.

FIG. 3 illustrates a vertical cross section of the apparatus 100, and the flow of air and liquid in detail according to the design principle of the present invention. Liquid streams 304 are delivered through the descending pipes 114 onto each evaporative media layers from 204 to 206. For each intersections between the descending pipe and the evaporative media layer, there are two openings 116, located along the surface of the pipes, opposing each other, and immediately above the surface of the evaporative media layer. Liquid streams 304 leaves the descending pipes through one of the openings 116 onto the evaporative media layer as illustrated by 312. Liquid re-enter the descending pipes, after heat exchange, through the opposing opening 116 as illustrated by 310, and proceed to the evaporative media immediately below. The details of how liquid flows 304 are separated and re-directed within the descending pipes will be illustrated in FIG. 4 in greater details.

To be consistent with conditions postulated in the previous examples, we assume an exemplary situation where warm air is drawn into the apparatus 100 from below. FIG. 3 illustrates the path of air streams as they rise after entering through the opening 106. There are two locations where air streams are blocked and redirected. The first location is at the bottom layers 206 of each evaporative media unit, since it is configured as an intact circular disc, without it's center portion removed. The second location is at the sealing corners 302. A first evaporative media unit 320 and a second evaporative media unit 322 are shown in this figure for the purpose of illustration. The warm air streams 306 rise upward and are blocked by the first bottom layer 206 and the first sealing corner 302. As a result. the air streams are forced horizontally and split along paths 307, as they pass through each evaporative media layer of the first evaporative media unit 320. After the streams 307 reach the center opening formed by layers 204 and 205, they collectively rise as illustrated by 308. The upward air stream 308 is subsequently blocked by the second bottom layer 206 from the second evaporative media unit 322, and forced side ways as illustrated by 309. Air streams 309 repeat the pattern as it rise further upstream, as illustrated by air streams 306, when they are blocked by the second sealing corner 302 in their rising path. In general, as warm air rises, it is forced 1) to pass through each layer of the evaporative media module for heat exchange, and 2) to changed direction at least twice as it pass every evaporative unit. Air eventually exit at the top the apparatus much cooler in this exemplary situation.

Figure 6:
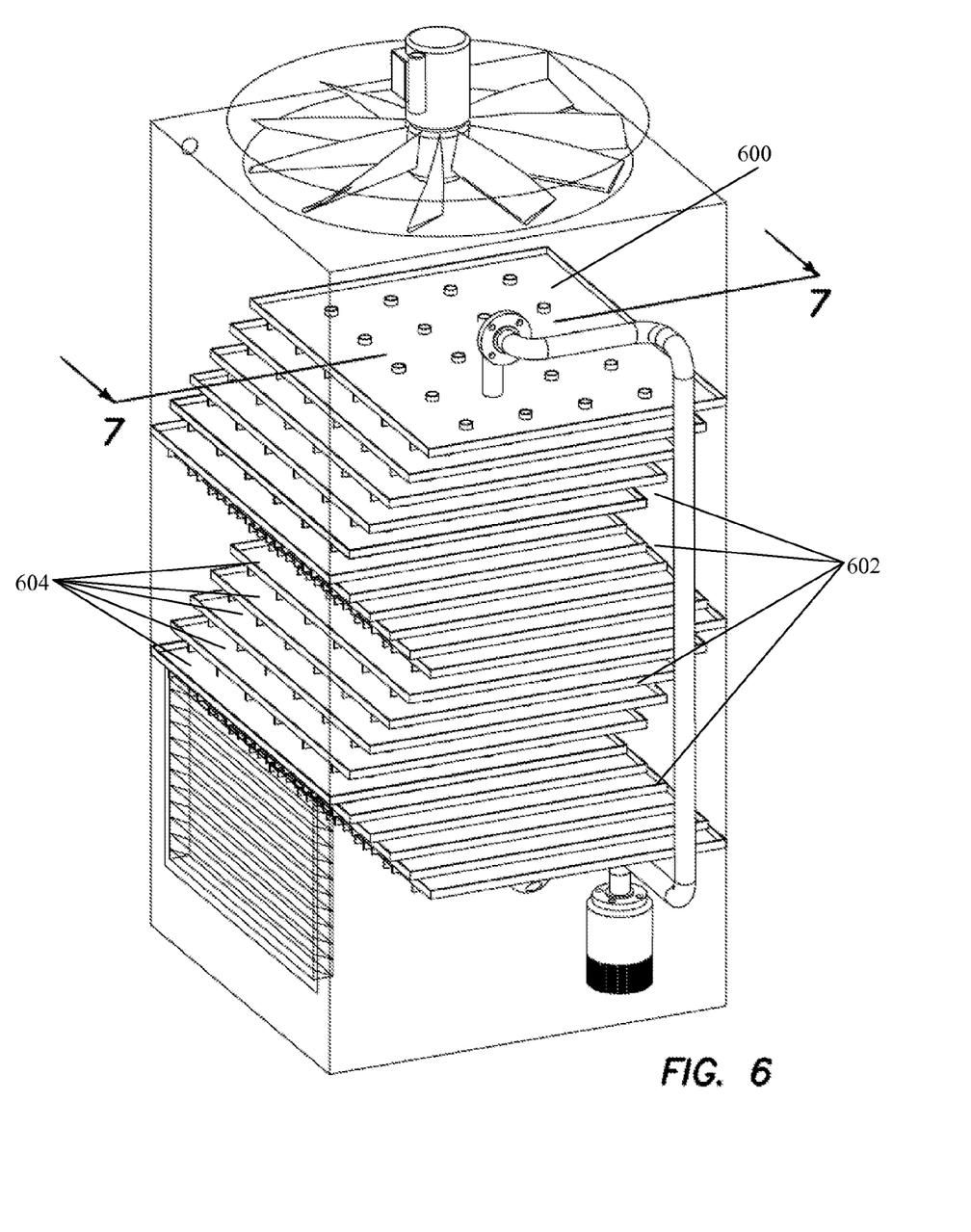
FIG. 6 is a schematic drawing which illustrates a variation, both in shape and in organization, of the multi-layered evaporative media disposed inside of a cooling chamber, connected with liquid and air circulation system, according to some embodiments of the present invention.
Figure 7:
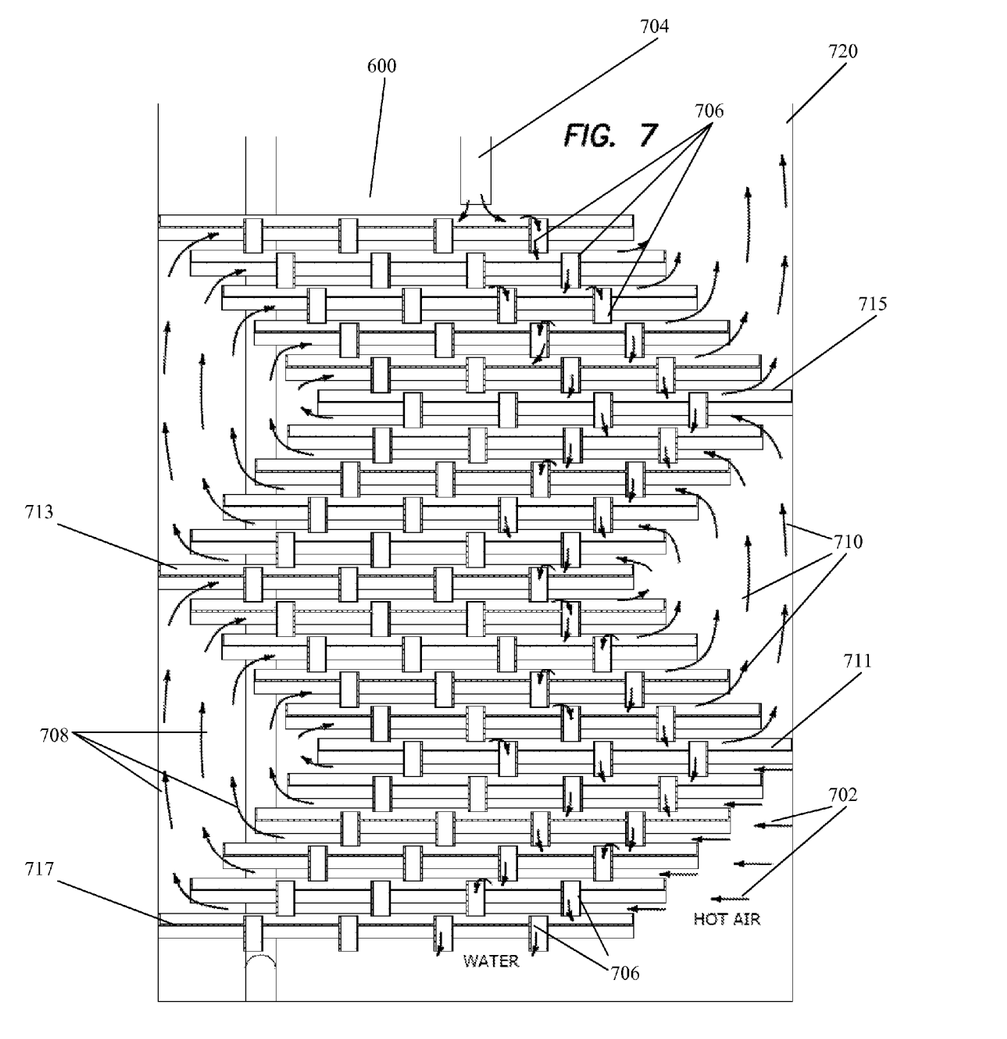
FIG. 7 is a schematic drawing of a vertical cross-section of the multi-layered evaporative media shown in FIG. 6, for the purpose of illustrating the circulation of liquid and air among each layer, according to some embodiments of the present invention.

Sealing corners 302 are introduced where the shape of the horizontal cross sections of the cooling tower and the evaporative media module are different. In FIG. 3, the horizontal cross section of the evaporative media module is circular, while the horizontal cross section of the cooling tower is rectangular. It is entirely conceivable to manufacture the housing of the cooling tower with a circular horizontal cross section. In those cases, the radius of the inner surface of the housing can match the radius of the outer edge of the top layers 204 of the evaporative media. Alternatively, a sealing membrane of various shapes can be introduced to fill up any gap between the outer edge of any evaporative media layers 204-206, and the inner wall of the cooling tower. The purpose of these variations in configuration is to maintain the air flow in a similar pattern as depicted in FIG. 3. FIGS. 6 and 7 below will discuss yet another variation where the horizontal cross section of the evaporative media module itself is rectangular in shape.

The sealing corners, membranes, as well as the bottom layers of each evaporative units 206 can be manufactured with pores or openings on purpose. As a result, the amount of moisture leaving the cooling apparatus can be regulated to achieve a desirable condition.

Two major advantages, in terms of functionality, are achieved by the design of the present invention. First, as a heat exchange apparatus, the design ensures the longest possible pathway as air travel through the evaporative media layer by layer, and thus maximize the surface area where heat exchange can take place. Second, the sudden change of directions of airflow, at multiple locations in a repeatable fashion, serves the function of a drift eliminator or regulator, where water droplets suspended in the air can be block, as discussed in the review section of this application.

Conventional cooling towers often employ a water spraying mechanism where sprinklers shoot out water mists onto some types of evaporative media at various locations. While spraying water increase surface area for heat exchange between water and air, it introduces large water droplets. Drift eliminators, as separate units, have to be physically installed above the cooling tower to prevent the water droplets from leaving the cooling tower and possibly polluting the nearby environment.

Apart from the two major advantages discussed above, the design of the present invention also introduce a novel water/liquid delivering system, where water/liquid can be delivered with much less turbulence onto each layer of the evaporative media module. One of the advantages of such a water delivery system is to reduce the amount of water droplets suspended in air. Heat can be more effectively absorbed by water/liquid on the surface of the evaporative media layer, rather than by water droplet or mist.

Figure 4:
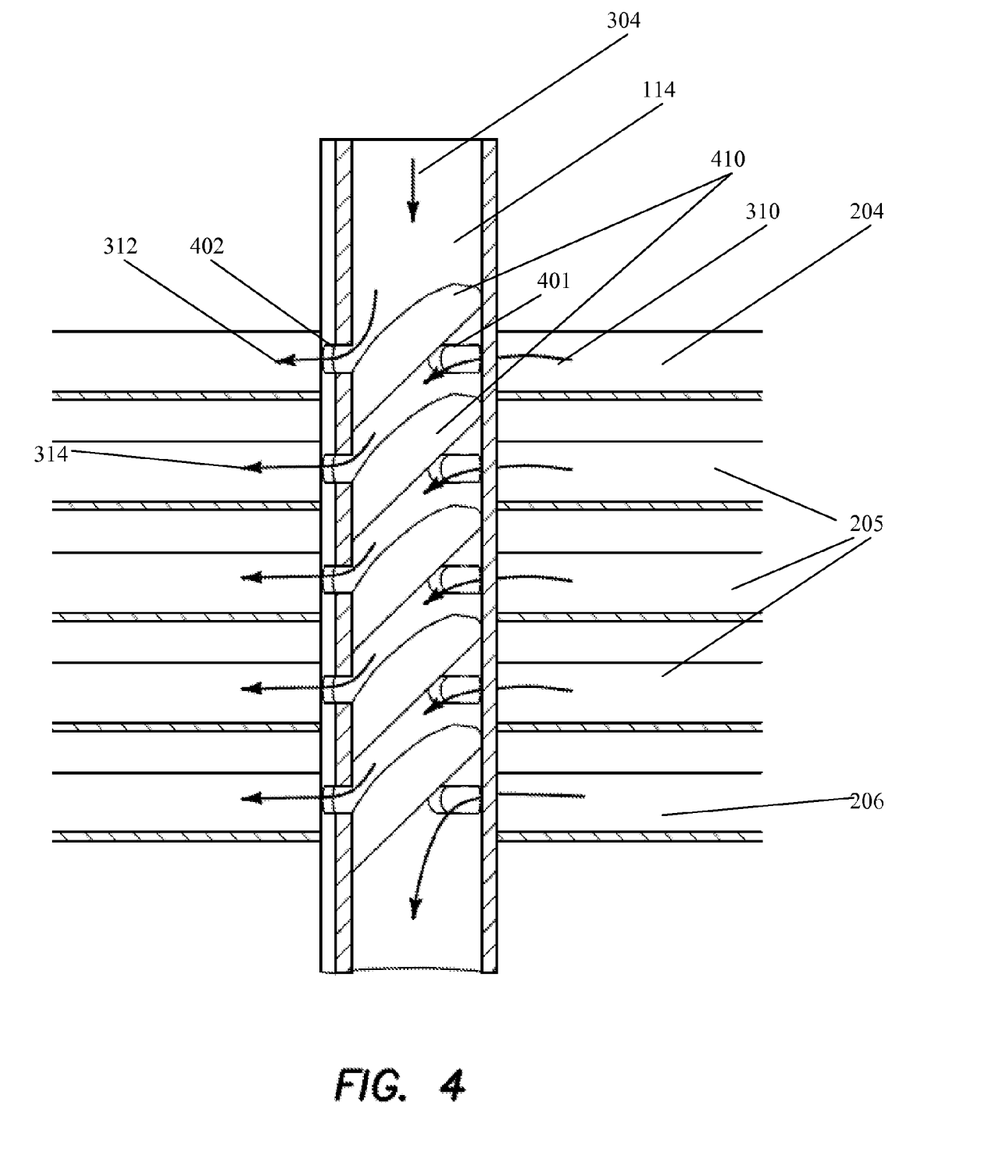
FIG. 4 is a schematic cross-section of the descending pipes, with flow directors directing liquid from an upper layer to a lower layer of the evaporative media, according to some embodiments of the present invention.

FIG. 4 illustrates a vertical cross section of a descending pipe 114 as it traverses through the evaporative media layers 204-206 in succession. The inner surface of the descending pipes is fitted with a series of flow directors 410. The flow directors 410 are made of a series of discs. They are secured diagonally inside of the descending pipes. Two openings 401 and 402, opposing each other, are illustrated along the side surface of the descending pipes immediately above the evaporative media layer 204. The elevated end of the flow director 410 sits immediately above the opening 401, while the lower end of the flow director 410 sits immediately below the opening 402. This configuration ensures the liquid flow 304 only leaves the descending pipe following the path 312 through the opening 402 onto the evaporative media layer 204. While the liquid, remaining on the surface of layer 204 for heat exchange purpose can only leave the evaporative media layer through opening 401 following the path 310. The flow directors are configured diagonally in succession, parallel to one another, and forming a series of channels for fluid to flow downward one layer at a time. As a result, the exiting flow 310 from layer 204 in turn, becomes the entering flow of 314 for the layer 205 immediately below. FIG. 4 illustrates the flow of liquid by gravitational force through an entire evaporative media unit, from the top layer 204, through intermediate layers 205, then exiting the bottom layer 206 onto the next evaporative unit, and ultimately returning to the swamp tank at the bottom of the cooling tower.

Flow directors 410, as illustrated in FIG. 4, allow liquid to enter and to leave the descending pipes through openings on the opposite side of the descending pipes. This arrangement forces the liquid to physically remain on the surface of each evaporative layer for an extended time period, and thus allowing heat exchange to take place. The time period, for liquid to remain on the surface of each evaporative media layer, can be further extended by introducing physical obstacles between the openings 401 and 402.

In a variant, the series of flow directors can be connected to form a spiral (or slide) inside of the descending pipes with openings on respective layers, allowing water/liquid to flow in and out of the pipes onto respective evaporative media layers.

Figure 5A:
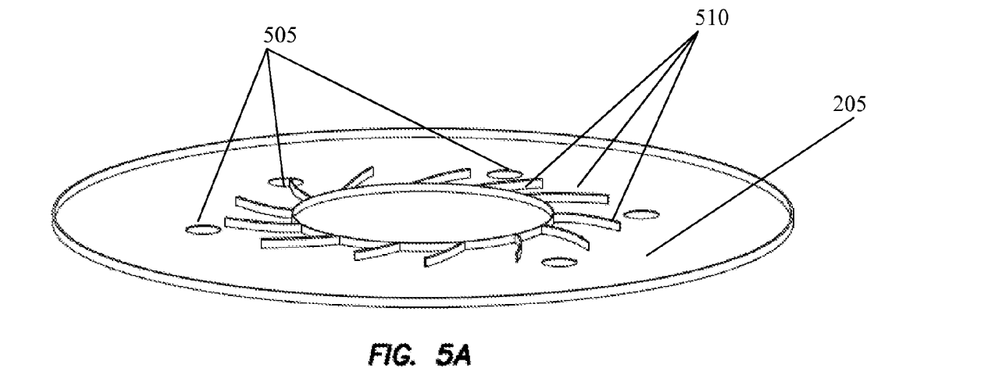
FIG. 5a-5b illustrate a single layer of the evaporative media with fins or grooves, according to some embodiments of the present invention.
Figure 5B:
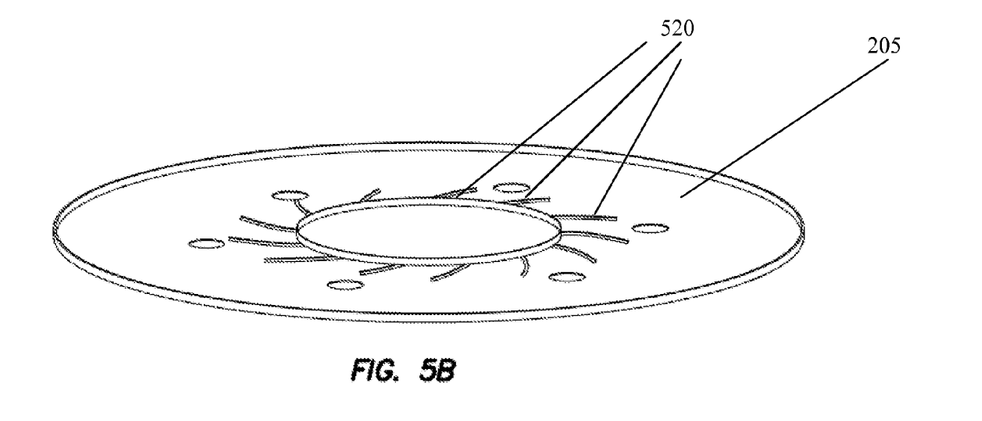

FIG. 5A and FIG. 5B illustrates two examples. In FIG. 5A, series of fins 510 are erected on the surface of the evaporative media layer 205. The fins 510 increase the distance and time for liquid to enter and to leave the layer through the intersections 505 from the descending pipes. FIG. 5B illustrates another example, where series of grooves or indentations 520 are made on the surface of the evaporative media layer 205 for the same purpose. It should be noted that the exact patterns of fins or grooves can be adjusted based on empirical studies. Patterns depicted in FIG. 5A & B are for illustrating the concept only.

The liquid/water delivery system of the present invention allows liquid to be evenly distributed onto each layer of the entire evaporative media module, and thus improves heat exchange efficiency. The present design avoids the problem of unevenness in water distribution by a conventional sprinkler system, as illustrated in the review section of the present application.

As discussed earlier, the shape of the evaporative media or the housing of the cooling tower can be modified, as long as the principles of the present invention is preserved. These principles are 1) A layered evaporative media module to maximize the surface area for heat exchanged between liquid and air; 2) Air pathway with periodic directional changes to facilitate heat exchange, as well as to eliminate drift by water droplets. 3) A calm liquid delivery systems that is embedded throughout the entire evaporative module.

FIG. 6 illustrates a variation in design based on the principles of the present invention. The evaporative media module 600 comprises square shaped evaporative media units 602 stacked vertically on top of one another. Each evaporative media unit comprises square shaped horizontal evaporative media layers 604. The horizontal layers 604 stack vertically on top of another, but shifts towards or away from the wall of the cooling tower with a fixed interval. The path depicted between the two numbers 7 illustrates the direction of a side view of the cooling tower, shown in detail in FIG. 7.

FIG. 7 illustrates a side view of the heat exchange apparatus from FIG. 6. The evaporative media module 600 is disposed inside the housing 720. The ascending pipes remains unchanged, and fluid 704 is released onto the top surface of the evaporative media module directly. Descending pipes, in this exemplary embodiment, is no longer continuous and connected. Fluid flows down by gravitational force through a series of vertical openings 706 evenly distributed on the surface of each evaporative media layer.

To be consistent with conditions postulated in the previous examples, we assume an exemplary situation where warm air 702 is drawn into the apparatus from below and rise upstream as directed by the blower on top. As the warm air streams 702 enter, it's upward path is blocked by the top layer 711 of the adjacent evaporative media unit. The warm air streams 702 thus are forced to travel horizontally leftwards, passing through the surface of each evaporative media layer for heat exchange. As the air streams emerge from the left side of the evaporative media units, they are sandwiched between the evaporative media layers 713 and 717, and force upwards as streams 708. By the same token, streams 708 is then forced horizontally rightwards, passing through the surface of each evaporative media layer for heat exchange. As the air emerges from the right side of the evaporative media units, it is then sandwiched between the evaporative media layers 711 and 715, and again forced upwards as streams 710. Heat exchange takes place on the surface of each evaporative media layer as warm air rises from below, and exits the cooling tower from the top as cooler air.

FIG. 7 illustrates a situation where each evaporative media layer is displaced horizontally towards or away from the inner war of the cooling chamber in a periodical fashion. The goal of such a systematic displacement is to manipulate the air pathways, and force air streams to change directions periodically while they pass through the tops surface of the layers for heat exchange. Although the evaporative module in FIG. 7 has a rather different design compared to the one in FIGS. 1 and 2, it adheres to all the design principles of the present invention discussed previously. It is entirely conceivable that different shapes and arrangements can be achieved based on these principles. FIG. 1 and FIG. 7 illustrate only two exemplary embodiments of the present invention.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to achieve the desired features of the present invention. Also, a multitude of different constituent module names other than those depicted herein can be applied to the various partitions.

Although the invention is described above in terms of various exemplary embodiments and implementations, it should be understood that the various features, aspects and functionality described in one or more of the individual embodiments are not limited in their applicability to the particular embodiments with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A liquid flow diverting system comprising a series of flow directors situated inside of a pipe forming a series of channels wherein fluid flows from one evaporative media layer to a next immediately below, wherein the pipe is configured with opposing openings positioned immediately above respective evaporative media layers.

2. The liquid flow diverting system of claim 1 comprising flow directors configured to be parallel to one another, wherein fluid flows in between adjacent flow directors.

3. The liquid flow diverting system of claim 1 comprising flow directors diagonally disposed inside of the pipe, with an elevated end terminating above an opening from an upper evaporative media layer, and a lowered end terminating below an opposing opening from an evaporative media layer immediately below.

4. The liquid flow diverting system of claim 1 comprising flow directors configured to match the shape of a cross section of the pipe.

* * * * *